United States Patent
Jones et al.

(10) Patent No.: US 6,925,424 B2
(45) Date of Patent: Aug. 2, 2005

(54) METHOD, APPARATUS AND COMPUTER PROGRAM PRODUCT FOR EFFICIENT PER THREAD PERFORMANCE INFORMATION

(75) Inventors: Scott Thomas Jones, Austin, TX (US); Frank Eliot Levine, Austin, TX (US); Luc Rene Smolders, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 10/687,247

(22) Filed: Oct. 16, 2003

(65) Prior Publication Data

US 2005/0086028 A1 Apr. 21, 2005

(51) Int. Cl.⁷ ............................. G06F 7/00; G06F 9/00; G06F 11/30
(52) U.S. Cl. ...................... 702/187; 702/186; 712/227
(58) Field of Search .......................... 702/79, 89, 125, 702/176, 180, 186, 187; 395/677, 704; 711/217; 712/421, 220, 227; 717/127, 128, 130, 131, 158; 718/108

(56) References Cited

U.S. PATENT DOCUMENTS 6,016,466 A    1/2000  Guinther et al. ............ 702/187

2004/0123084 A1 *  6/2004  DeWitt et al. .............. 712/227

OTHER PUBLICATIONS

Jones, et al., "Method, Apparatus and Computer Program Product for Efficient, Large Counts of Per Thread Performance Events," IBM Docket AUS920030599US1, May 2003.

* cited by examiner

*Primary Examiner*—John Barlow
*Assistant Examiner*—John Le
(74) *Attorney, Agent, or Firm*—Diana Roberts-Gerhardt; Anthony V S England

(57) ABSTRACT

A value in a counter on a processor is incremented for occurrences of a monitored event, providing a measured value for the event. The value of the counter register for a first thread is saved responsive to a switch from the first thread to a second thread. The value is saved in an accumulator in system memory. Then, responsive to a switch back to the first thread, the value for the first thread is restored from the accumulator. In this way, a counter may be read, and its value, for the first thread, for example, remains consistent despite any intervening thread switches. Since the counter register may be read directly, in the user state, this provides a faster and more consistent way to update performance counts.

21 Claims, 3 Drawing Sheets

METHOD, APPARATUS AND COMPUTER PROGRAM PRODUCT FOR EFFICIENT PER THREAD PERFORMANCE INFORMATION

BACKGROUND

1. Field of the Invention

The present invention relates to performance monitoring of a computer system or of some aspect of a computer system, such as a processor or memory or software running on the system, and, more particularly, to managing counters for such performance monitoring.

2. Related Art

According to the IBM AIX operating system, a performance monitor function of the operating system ("OS") services a performance monitoring API. This servicing includes accessing 64-bit performance monitoring accumulators. (The AIX operating system is a product of, and "AIX" is a trademark of, International Business Machines Corporation.) The accesses to the accumulators are by means of operations in the "system" state since the accumulators are conventionally located in system memory. The Power and PowerPC processor architectures provide a set of 32-bit performance monitor counters. These counters are registers on the Power and PowerPC processors. (Power and PowerPC processors are products of, and "Power" and "PowerPC" are trademarks of, International Business Machines Corporation.) Conventionally, all the counter registers on the processor are used for storing performance-measurement-related counts for a single processing thread. Consequently, each time there is a thread switch the OS performance monitoring function reads the 32-bit performance monitor counters for the thread losing control and adds the counter values to respective 64-bit performance monitoring accumulators. The OS performance monitoring function then resets the 32-bit counters so that the counts all start over at zero for the thread that is gaining control. This resetting tends to prevent the counters from overflowing.

Also, according to the Power and PowerPC processor architectures, a first such 32-bit counter affects another 32-bit counter if the count value of the first counter exceeds a certain limit. For this architecture, resetting of a counter value by the performance monitor is also useful to avoid unwanted counter interaction.

It is known to use the performance counters and accumulators in connection with measuring for a wide variety of events, such as measuring how many instructions have completed for a subroutine. Ideally the sampling time for measuring performance of an event is small in comparison with duration of the event itself. However, some measured events occur very quickly. For example, some subroutines are only a few instructions long. As previously stated, the conventional performance monitoring operation that manages the 64-bit performance monitoring accumulators involves the system state. Unfortunately, the overhead for invoking the system state involves perhaps thousands of instructions.

If an arrangement for measuring duration of a performance event cannot provide fast sampling time in comparison with the measured event, then the delay associated with measurement sampling time should at least be consistent from one measurement instance to the next. However, the above described arrangement does not provide consistent measurement overhead. That is, the above described system-state-related operation is required for measurement overhead, but in comparison with the execution time for running a subroutine of a few instructions, variation in execution time can be significant from one instance to the next for a system call involving 1000 instructions. Thus, the previously known arrangement for measuring performance of short-duration events is problematic.

SUMMARY OF THE INVENTION

The foregoing problem is addressed in the present invention. Since the 32-bit performance monitoring counters are hardware registers on the processor they are accessible in the "user" state, which involves less sample time overhead. However, according to the present convention, as described above, the 32-bit counters are constantly being reset in connection with thread switches to avoid overflow and counter interaction. The invention involves a recognition of the usefulness of reading the 32-bit counters directly despite the fact that their values are conventionally corrupted by resetting with each thread switch. The invention provides a way to use the accumulators and the 32-bit counters in a manner that permits the counters to be accessed more directly for performance measurement and that overcomes the complications of thread switching, counter resetting, overflow and interaction.

According to one form of the invention, a value in a performance monitoring counter register on a processor is incremented for occurrences of a monitored event, providing a measured value for the event. The value of the counter register for a first thread is saved responsive to a switch from the first thread to a second thread. The value is saved in a performance monitoring accumulator in system memory. Then, responsive to a switch back to the first thread, the value for the first thread is restored from the accumulator (instead of resetting the counter value). In this way, a performance monitoring counter register may be read, and its value, for the first thread, for example, provides a coherent meaning relative to a previous value for the same thread, despite any intervening thread switches. Since the counter register may be read directly, in the user state, this provides a faster and more consistent means for updating performance counts. Moreover, the value is saved in the accumulator in a manner consistent with the conventional accumulator format so that a larger accumulated value for the measured value can still be read using the conventional performance monitoring API.

Additional objects, advantages, aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
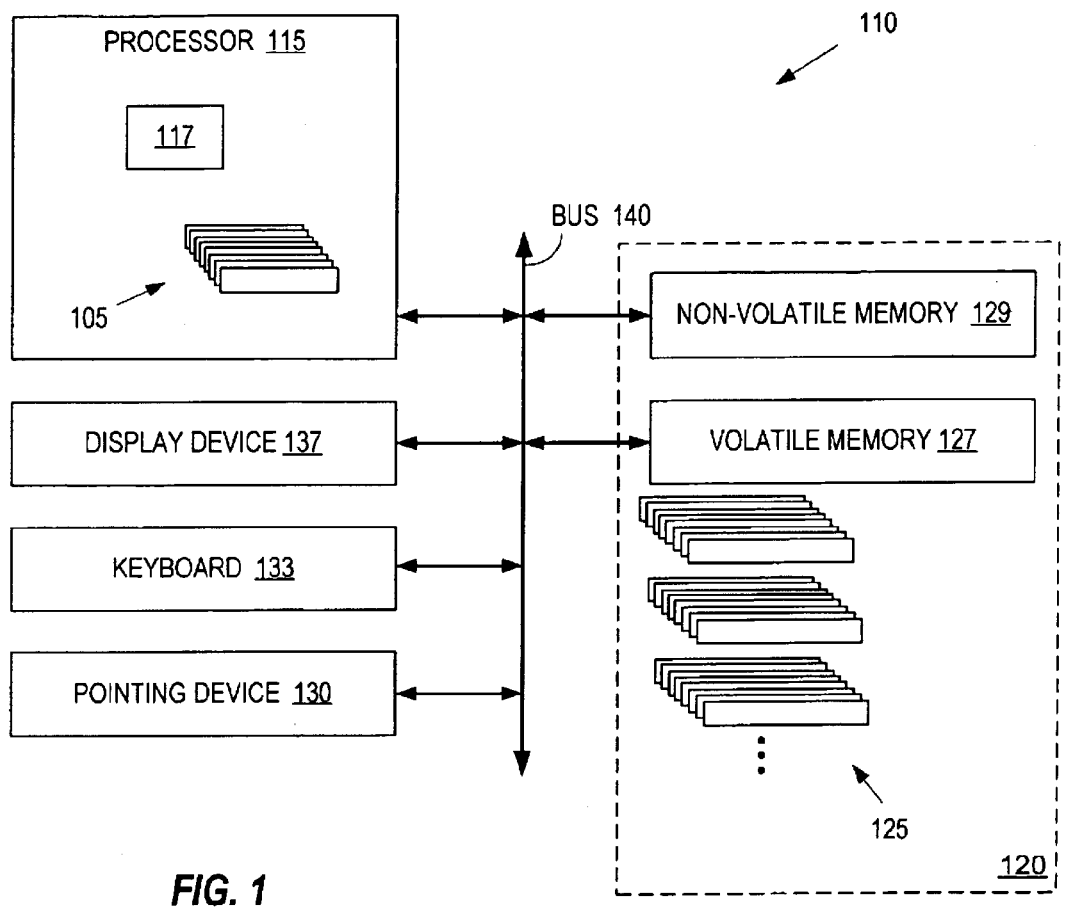
FIG. 1 illustrates a system for performance monitoring in connection with a computer processor, according to an embodiment of the present invention.

Referring to FIG. 1, a block diagram illustrating a computer system 10 is shown, according to an embodiment of the present invention. The system 110 includes a processor 115, a volatile memory 127, e.g., RAM, a keyboard 133, a pointing device 130, e.g., a mouse, a non-volatile memory 129, e.g., ROM, hard disk, floppy disk, CD-ROM, and DVD, and a display device 137 having a display screen. Memory 127 and 129 are for storing program instructions, which are executable by processor 115, to implement various embodiments of a method in accordance with the present invention. Memory 127 or memory 129 are also referred to herein either individually or collectively as system memory 120. Components included in system 110 are interconnected by bus 140. A communications device (not shown) may also be connected to bus 140 to enable information exchange between system 110 and other devices.

In various embodiments system 110 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries.

A set of eight, 32-bit performance monitoring counters 105 are shown on processor chip 115. These counters 105 are hardware registers on processor chip 115, as shown, and are coupled to performance monitoring logic 117 on the chip 115. The logic 117 is user programmable to monitor on processor chip 115 for a predetermined event of interest (a "performance event") such as instruction completion, processor cycles, branch instruction issuance, branch misprediction, instruction dispatch, cache miss, pipeline full, floating point unit busy, etc. Likewise, particular ones of the counters 105 are designated to accumulate 32-bit counts on processor chip 115 for respective ones of the preselected performance events. Once the user programs logic 117 for selected performance events, including designating which ones of the counters 105 are for which events, the performance events are detected and the appropriate counter 105 is responsively incremented by logic 117 directly, i.e., without any further software involvement. The net effect is that a value in a performance monitoring counter register 105 on processor 115 is incremented for occurrences of a monitored event, providing a measured value for the event.

Since processor 115 supports thread switching, and since there are a limited number of counters 105 and numerous events of interest to count, the values in the counters 105 are maintained in correspondence with what ever thread is active at a given time. That is, when there is a thread switch the values in the counters 105 are correspondingly "switched" as well, so to speak. Specifically, the values in the counters 105 are accumulated in space that is set aside in system memory. This is illustrated in FIG. 1, where system memory 120 is shown (coupled to processor 110 by bus 130), including sets of 64-bit accumulators 125. Each of the accumulator sets 125 has eight accumulators, corresponding to the eight counters 105. Likewise, the operating system establishes at least as many accumulator sets 125 as there are threads. Thus the number of accumulator sets 125 may number even in the thousands.

The value of the counter registers 105 for a first thread are saved, responsive to a switch from the first thread to a second thread, in the one of the sets of performance monitoring accumulators 125 that is set aside for that first thread. As stated herein above, it has previously been conventional to then reset the values of the counter registers 105, so that the counting for the second thread began over again at 0. However, according to the present invention, responsive to a thread switch the values in the counter registers 105 are restored to their previous value for the newly active thread. For example, responsive to a switch back to the first thread, the counter 105 values for the first thread are restored from the first thread's set from among the sets of accumulators 125.

Figure 2:
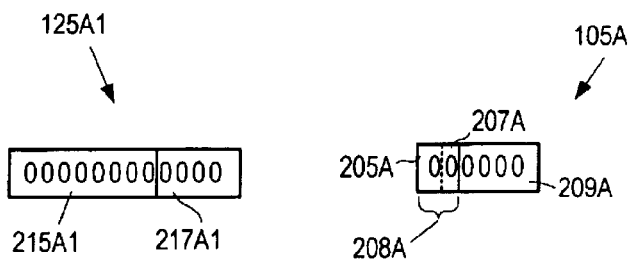
FIG. 2 illustrates details of a performance monitoring counter and corresponding accumulator, according to an embodiment of the present invention.

Referring now to FIG. 2, details are shown for one of the performance monitoring counters 105A and a corresponding one of the accumulators 125A1 for one thread. As stated above, the value of the counter register 105A for a first thread is saved, responsive to a switch from the first thread to a second thread, and then restored when the first thread regains control, i.e., is the "active" thread. In this way, the value of counter 105A while the first thread is active provides a consistent meaning relative to a value of counter 105A that was read during a previous time when the first thread was active, despite any intervening thread switches.

In at least one respect there is no longer a need, from one thread switch to the next, to accumulate values of counter 105A in system memory 120 (FIG. 1) accumulators 125, since according to the invention counter 105A now provides an accumulator whose state is preserved despite thread switches. Rather, it would be sufficient from the standpoint merely of the counter 105A to overwrite the previously saved value in system memory 120 for accumulator 125A1 each time counter 105A value is saved. This would intuitively seem even necessary, or at least most efficient. That is, this would seem more efficient than perhaps needlessly using resources to add the counter 105A value to the accumulator 125A1. And it would even seem necessary in order to preserve the value from the counter 105A so that it can later be restored when the first thread is again active.

Moreover, since counter 105A has enough bits to count 2 billion occurrences of an event it would seem reasonable in many cases to overwrite the 64-bit accumulator in system memory 120. Nevertheless, according to this embodiment of the present invention the counter value 105A does not overwrite the accumulator 125A1 value, but rather is merged in a certain fashion with the accumulator 125A1 value, as will be described below. Moreover, a preferred embodiment of the present invention provides a new way for efficiently merging values from the counters 105 into the accumulators 125 rather than simply adding them, but doing so in a manner consistent with the accumulators's conventional format such that the accumulators's values are preserved as accumulated values. Thus the 64-bit value of accumulator 125A1, for example, can still be read using the previously mentioned, conventional performance monitoring API. At the same time information in the accumulator 125A1 is preserved to an extent such that a proper value can be restored back to the counter 105A when the first thread regains control.

To facilitate the above described features certain segments of the counters and accumulators are identified and treated in different fashions, as will be illustrated with an example for counter 105A and accumulator 125A1. The segmentation that is imposed on the counters and accumulators is shown in FIG. 2, in which the highest bit 205A of the 32-bit counter 105 is considered as a "sign" bit. (This particular segment is actually a feature of a conventional performance monitoring architecture of the Power and PowerPC processors.) The next lowest bit 207A is considered as a "guard" bit, according to an embodiment of the present invention. Bits 205A and 207A taken together are considered to be a most-significant-bit segment 208A. The remaining 30 bits are considered together and referred to as the least-significant-bits ("LSB's") segment 209. The highest 34 bits of the 64-bit accumulator 125A1 are considered together and referred to as the most-significant-bits ("MSB's") segment 215A1. The remaining 30 bits are considered together and referred to as the least-significant-bits ("LSB's") segment 217A1.

According to a preferred embodiment of the invention, responsive to a switch from the first thread to a second thread the value of the counter register 105A for the first thread is merged with a value in the accumulator 125A1 in a manner by which the value is also essentially saved so that it can later be restored to the counter 105A.

Figure 3:
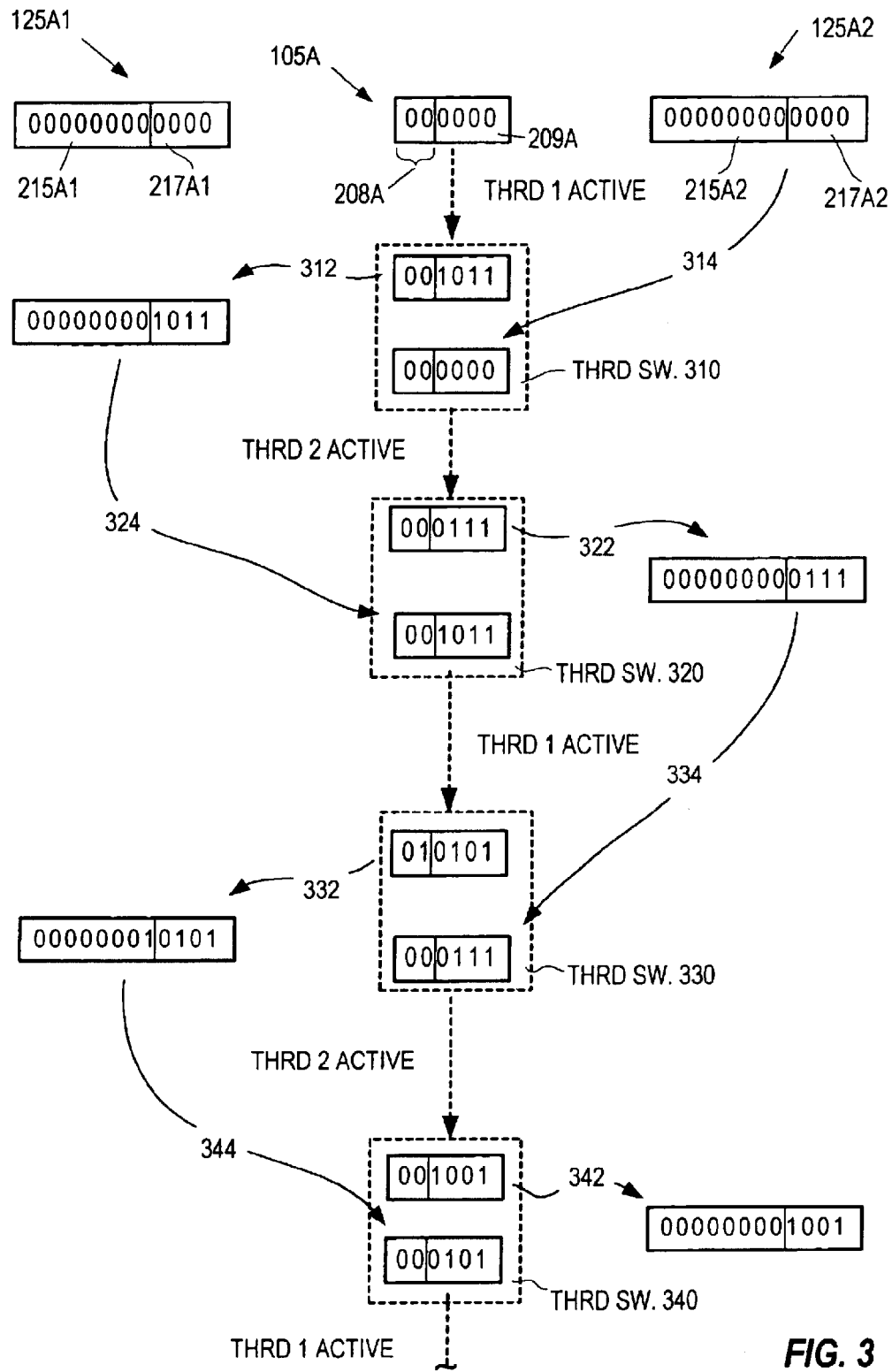
FIG. 3 illustrates a process by which information is manipulated for representative performance monitoring accumulators and a counter, according to an embodiment of the present invention.

Referring now to FIG. 3, details of this process are illustrated, according to an embodiment of the present invention. At the top of the figure counter 105A is shown between two accumulators 125A1 and 125A2. (The counter 105A and the accumulator 125A1 were previously shown in FIG. 2. However, in order to simplify this example counter 105A is depicted as having only six bits and the accumulators 125A1 and 125A2 are each depicted as having only 12 bits.) Accumulator 125A1 is for accumulating counts for counter 105A in connection with a first thread, while accumulator 125A2 is for accumulating counts for counter 105A in connection with a second thread. Counter 105A and accumulators 125A1 and 125A2 are shown to be initialized at the top of the figure so that all their bits are set to "0." Counter 105A is next incremented for each occurrence of its associated monitored event while thread 1 is active. Then, a thread switch occurs at 310, as shown. At this point counter 105A has counted up to a value of "00:1011," as shown. (This, of course is an arbitrary count, assumed merely for the sake of illustration. Here, and herein after in the text, a ":" is shown merely for the reader's convenience to delimit segments of the counter bits.) Responsive to the thread switch 310, value in the counter 105A is "merged" with the value in accumulator 125A1 in the following fashion. (Note that the various segments, such as the most-significant-bits segment 215A1 and least-significant-bits segment 215A2 of accumulator 125A1, the most-significant-bits segment 208A and the least-significant-bits segment 209A of counter 105A, etc. are treated in different ways in the merging of counter 105A values with accumulator 125A1 and 125A2 values and in the restoring of the counter 105A values described herein.) The least significant bits 215A2 of accumulator 125A1 are overwritten at 312 by the least significant bits 209A of counter 105A, whereas the most significant bits 208A of counter 105A are added at 312 to the most significant bits 215A1 of accumulator 125A1. Next, at 314, the most significant bits 208A of counter 105A are reset, and the least significant bits 209A are overwritten by the least significant bits 217A2 of accumulator 125A2. Since only thread 1 has been active so far, all the bits of accumulator 125A2 are still "0," so this overwrites bits 209A with zeros, as shown. Now the counter 105A is set up so that thread 2 can proceed.

Counter 105A is next incremented for each occurrence of its associated monitored event while thread 2 is active. Then, a thread switch back to thread 1 occurs at 320, as shown. (It should be understood, of course, that many more than two threads are contemplated. However, for the sake of illustration this example depicts only thread switching between thread 1 and thread 2.) At this point, counter 105A has counted up to a value of "00:0111" for thread 2, as shown. (Again, this is an arbitrary count, assumed merely for the sake of illustration.) Responsive to the thread switch 320, the value in the counter 105A is merged with the value in accumulator 125A2. That is, the least significant bits 215A2 of accumulator 125A2 are overwritten by the least significant bits 209A of counter 105A and the most significant bits 208A of counter 105A are added to the most significant bits 215A2 of accumulator 125A2, at 322. Next, the most significant bits 208A of counter 105A are reset and the least significant bits 209A are overwritten by the least significant bits 217A1 of accumulator 125A1, at 324. As shown, this overwrites bits 209A with the value "1011," which was written to accumulator 125A1 bits 215A1 earlier (at 312). Now the counter 105A is set up so that thread 1 can again proceed.

Counter 105A is next incremented for each occurrence of its associated monitored event while thread 1 is active. Then, a thread switch back to thread 2 occurs at 330, as shown. At this point, counter 105A has counted up to a value of "01:0101" for thread 1, as shown, which is, again, an arbitrary count, assumed merely for the sake of illustration. Responsive to the thread switch 330, the value in the counter 105A is again merged with the value in accumulator 125A1. That is, the least significant bits 215A1 of accumulator 125A1 are overwritten by the least significant bits 209A of counter 105A and the most significant bits 208A of counter 105A are added to the most significant bits 215A1 of accumulator 125A1, at 332. Next, the most significant bits 208A of counter 105A are reset and the least significant bits 209A are overwritten by the least significant bits 217A2 of accumulator 125A2, at 334. As shown, this overwrites bits 209A with the value "0111," which was written to accumulator 125A2 bits 215A2 earlier (at 322). Now the counter 105A is set up so that thread 2 can again proceed.

Counter 105A is next incremented for each occurrence of its associated monitored event while thread 2 is active. Then, a thread switch back to thread 1 occurs at 340, as shown. At this point, counter 105A has counted up to a value of "00:1001" for thread 2, as shown, which is, again, an arbitrary count, assumed merely for the sake of illustration. Responsive to the thread switch 340, the value in the counter 105A is again merged with the value in accumulator 125A2. That is, the least significant bits 215A2 of accumulator 125A2 are overwritten by the least bits 209A of counter 105A and the most significant bits 208A of counter 105A are added to the most significant bits 215A2 of accumulator 125A2, at 342. Next, the most significant bits 208A of counter 105A are reset and the least significant bits 209A are overwritten by the least significant bits 217A1 of accumulator 125A1, at 344. As shown, this overwrites bits 209A with the value "0101," which was written to accumulator 125A2 bits 215A2 earlier (at 332). Now the counter 105A is set up so that thread 1 can again proceed.

An aspect of the present invention is a recognition there are certain simplifying assumptions that can be made which lead to the feasibility of the above described process. First, it is assumed that once counter 105A begins counting for a given thread the counter 105A does not overflow before there is a thread switch. Even further, it is assumed that the most-significant-bits segment 208A of the counter 105A is only incremented once from one thread switch to a next thread switch. It is a result of this assumption that a counter 105A value does not have to be compared to corresponding accumulator 125A1 or 125A2 and that bit values for a segment of counter 105A do not have to be added to corresponding accumulator 125A1 or 125A2 when the counter 105A value is "merged" with the value in the accumulator 125A1 or 125A2. Rather, based on this simplifying assumption the merging is permitted to be limited to simply overwriting the least significant bits in the accumulator 125A1 or 125A2 with the least significant bits of the counter 105A and adding only the designated most-significant-bit segments.

It should be a understood that the above described "assumptions" are not merely speculative supposition, but rather are based on a clear understanding of principles of operation, and their correctness depends upon a well-informed selection of the number of bits that are included the least-significant-bits segment of the counter. For a six-bit counter, for which only four bits are treated as the least-significant-bits segment this may not be a reasonable assumption. It should be kept in mind that according to an embodiment of the present invention the counters 105 each have 32 bits, and the segment of such a counter 105 which is considered to be the least significant bits is a 30-bit segment. This choice, to select the bottom 30-bits of the counters 105 as the least-significant-bits segment, is made based on an understanding of a maximum number of occurrences of performance events that will be encountered between thread switches.

It should be appreciated from the foregoing that the structure and procedure set out herein enable both the counter registers 105 and the accumulators 125 to maintain a coherent count of performance events despite thread switches. Consequently, coherent values may be read directly from counter registers 105 in the user state, with user code instead of by means of a system call, thus providing a faster and more consistent means for updating performance counts.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

Many additional aspects, modifications and variations are also contemplated and are intended to be encompassed within the scope of the following claims. For example, as explained herein above, for an architecture such as that of the Power or PowerPC processors one counter may interact with another counter when the most significant bit of the first counter is incremented. Consequently the most-significant-bits segment of the counter was selected to have a guard bit in addition to the sign bit. It should be understood that for an embodiment in which the counters do not interact in this fashion the most-significant-bits segment of the counter could be limited to a single bit.

As previously mentioned, the arrangement that has been described herein above maintains coherence of the 32-bit counters, which is advantageous because the 32-bit counters are processor hardware registers and they can therefore be read more quickly than can the 64-bit accumulators, which are in system memory. In many cases it may work fine to merely obtain a 32-bit value for a performance event, since it is not expected for counter overflow to occur if a proper size is selected for the least-significant-bits segment of the counters and the frequency of monitored events and thread switches are as expected. However, for extra certainty a preferred embodiment of the invention provides still more features that enable obtaining a 64-bit count with reduced sample time overhead.

Figure 4:
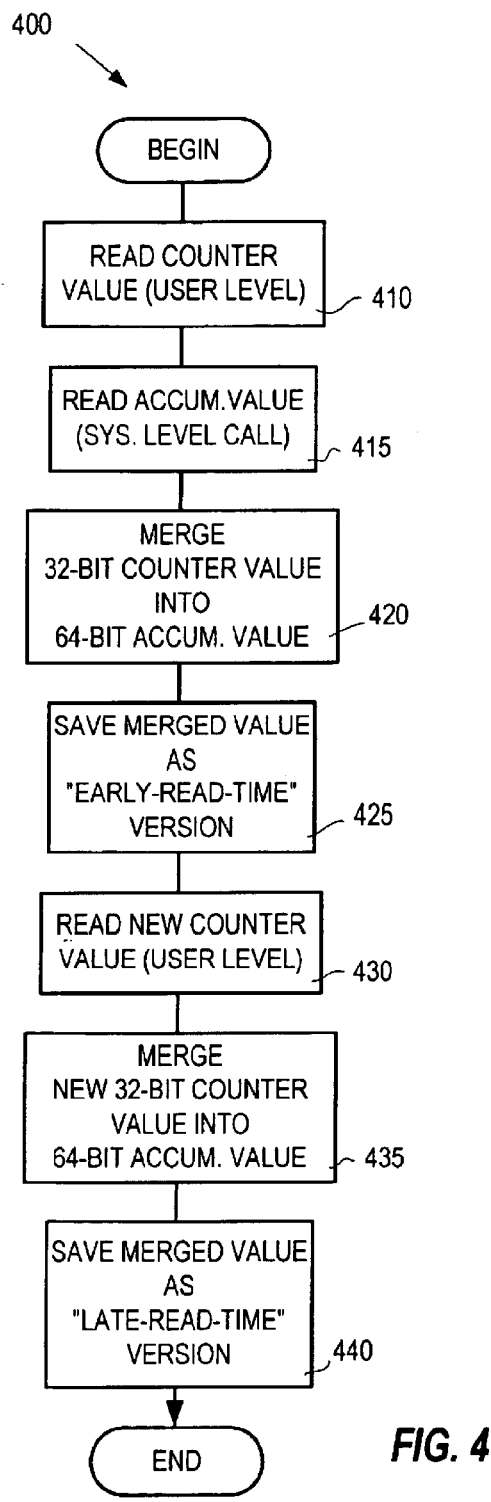
FIG. 4 an algorithm for reading a performance event accumulator, according to a preferred embodiment of the invention.

Referring now to FIG. 4, an algorithm 400 is shown for a preferred embodiment of the invention. Whenever the performance monitoring API is called upon for a monitored event count the API first reads the 32-bit counter in the user state, at logic block 410, which, as previously explained, requires very low overhead and thus short sampling time. Then, at logic block 415, the API performs a system call to read the 64-bit accumulator, which requires much more overhead and more variability regarding sampling time, as previously explained. Then, at block 420, the API merges the 32-bit counter value with the 64-bit accumulator value, as explained herein above, and, at block 425, saves this as an "early-read-time performance event count." Since the sample time is relatively large to read the 64-bit accumulator value, the 32-bit counter will have substantially changed by the time the 64-bit accumulator value is returned. So the API again reads the 32-bit counter (again in the user state, which requires little sample time) at block 430, merges this new 32-bit counter value with the same 64-bit accumulator value at block 435 (so that the merge is as fast as possible after reading the 32-bit counter the second time), and again saves this value at block 440, this time as a "late-read-time performance event count."

Figure 5:
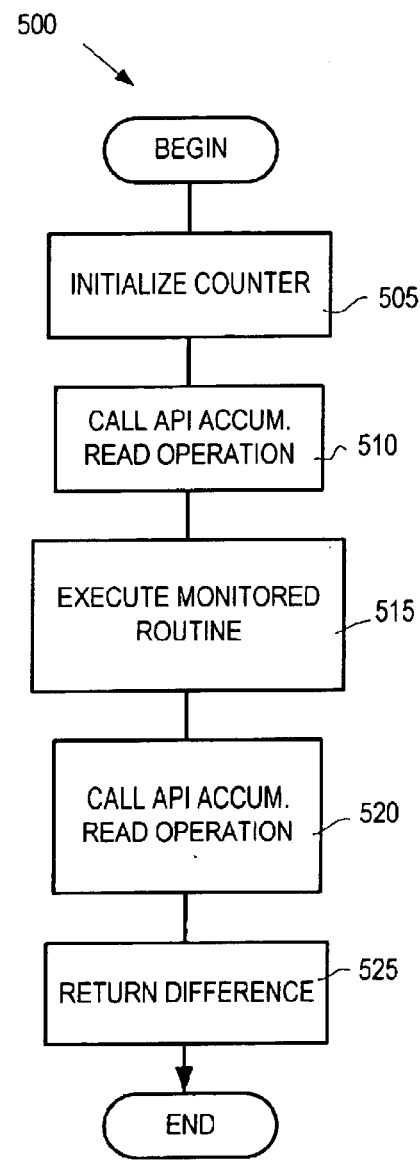
FIG. 5 illustrates an algorithm illustrating an example application of the algorithm set out in FIG. 4, according to a preferred embodiment of the invention.

With the addition of the early-read-time and late-read-time counts to the API call for a performance event count, a much more accurate count may be obtained for a monitored event. Referring now to FIG. 5, a related algorithm 500 is shown for a preferred embodiment of the invention illustrating an example application of the API function set out in the algorithm 400 of FIG. 4. In order to obtain an accurate count of instructions completed for a subroutine, a performance monitoring routine initializes one of the performance monitoring counters to count instructions completed at block 505. Then the performance monitoring routine invokes the API call at the beginning of the subroutine, at logic block 510. This reads the counter for a first value for the count of instructions completed (including both the early-read-time and late-read-time versions of the first count). Then, at block 515, the subroutine runs. At the end of the execution of the monitored subroutine the performance monitoring routine again invokes the call, at block 520. This determines a second value for the count (again including both the early-read-time and late-read-time versions of the second count). Then, at block 525, the performance monitoring routine calculates and returns the difference between the value of the late-read-time version of the first count and the value of the early-read-time version of the second count. This difference indicates a measured number of instructions completed for the subroutine. It is an advantage of this algorithm 500 that the number of instructions completed during the relatively large sample time for reading the accumulator is not included in the measured number of counts.

In one embodiment of the invention, the performance monitoring API includes functionality by which values of the 64-bit accumulators, which have been earlier read by the use of a more time-consuming system call, are also saved in a manner such that they are accessible in the user state so that they are more quickly accessible. In accordance with this practice, when a call is made to read values of the 64-bit accumulators, the 32-bit values of the counters are quickly read at the user level, i.e., by means of code not invoking a system call, and instead of reading the system-state-accessible accumulators the most-significant-bits of the user-state-accessible accumulators are augmented with the currently read 32-bit counter values.

Ordinarily this works fine, since it is not expected for counter overflow to occur if a proper size is selected for the least-significant-bits segment of the counters and the frequency of monitored events and thread switches are as expected. However, for extra certainty in an embodiment of the invention the processor includes a 64-bit hardware register and logic coupled to the register for providing an elapsed-time function. The logic increments the register each processor cycle, so that the register serves as an elapsed-time register. The value of this elapsed-time register is read in the user state each time a 32-bit performance event counter is read. User-level code saves the elapsed time value in association with the counter value and its associated thread. The current elapsed-time value is also compared to the elapsed-time value the last time the counter was read for the same thread, and if the difference is too big this provides an indication that the performance event counter may have overflowed, in which case the version of the accumulator that is accessible from the user state should not be relied upon. Instead, in response to this potential overflow indication the system-memory-version of the accumulator is read using the more time consuming system call.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for counting performance events for a computing system, wherein the system includes i) a processor having a set of on-chip performance monitoring counter registers and ii) system memory, the method comprising the steps of:

a) incrementing an N-bit value in one of the performance monitoring counter registers responsive to occurrences of a monitored event for a first processing thread so that the N-bit value provides a measured value for the event in association with the thread;

b) merging the N-bit value of the counter register for the first processing thread into an N+M-bit value in an accumulator in system memory, wherein the merging is responsive to a switch from the first thread to a second thread; and c) restoring the N-bit value for the first thread to the counter register from the accumulator responsive to a switch back to the first thread, wherein despite any thread switches the restoring maintains a value in the counter register for the first thread that is coherent relative to a previous value in the counter register for the first thread and the merging of the N-bit value into the accumulator maintains a coherent value for the larger, N+M-bit accumulated value.

2. The method of claim 1, wherein the counter register and the accumulator each have respective least-significant-bits segments and most-significant bits segments, and wherein step b) includes overwriting the least-significant-bits segment of the accumulator by the least-significant-bits segment of the counter, and adding the most-significant bits segment of the counter to the most-significant bits segment of the accumulator.

3. The method of claim 1, wherein step c) includes resetting the most-significant-bits segment of the counter and overwriting the least-significant-bits segment of the counter by the least-significant-bits segment of the accumulator.

4. The method of claim 1, comprising the step of performing an update-and-read operation responsive to a call to read the accumulator, the operation comprising the steps of:

reading a value of the counter in the user state;

reading a value of the accumulator in the system state;

merging the counter value with the accumulator value and saving this as an early-read-time performance event count;

reading a new value of the counter in the user state; and merging the new counter value with the accumulator value and saving this value as a late-read-time performance event count.

5. The method of claim 1, comprising the step of computing the number of monitored events for a certain process, the computing comprising the steps of:

performing a first update-and-read operation responsive to a call to read the accumulator at a beginning of the certain process, wherein such an update-and-read operation comprises the steps of:

reading a value of the counter in the user state;

reading a value of the accumulator in the system state;

merging the counter value with the accumulator value and saving this as an early-read-time performance event count;

reading a new value of the counter in the user state; and merging the new counter value with the accumulator value and saving this value as a late-read-time performance event count;

performing a second update-and-read operation responsive to a call to read the accumulator at an ending of the certain process;

calculating a difference between the late-read-time performance event count saved for the first update-and-read operation and the early-read-time performance event count saved for the second update-and-read operation.

6. The method of claim 5, wherein the counter register and the accumulator each have respective least-significant-bits segments and most-significant bits segments, and wherein step b) includes overwriting the least-significant-bits segment of the accumulator by the least-significant-bits segment of the counter, and adding the most-significant bits segment of the counter to the most-significant bits segment of the accumulator.

7. The method of claim 6, wherein step c) includes resetting the most-significant-bits segment of the counter and overwriting the least-significant-bits segment of the counter by the least-significant-bits segment of the accumulator.

8. An apparatus for counting performance events for a computing system, wherein the system includes i) a processor having a set of on-chip performance monitoring counter registers and ii) system memory, the apparatus comprising:
   a) means for incrementing an N-bit value in one of the performance monitoring counter registers responsive to occurrences of a monitored event for a first processing thread so that the N-bit value provides a measured value for the event in association with the thread;
   b) means for merging the N-bit value of the counter register for the first processing thread into an N+M-bit value in an accumulator in system memory, wherein the merging is responsive to a switch from the first thread to a second thread; and
   c) means for restoring the N-bit value for the first thread to the counter register from the accumulator responsive to a switch back to the first thread, wherein despite any thread switches the restoring means maintains a value in the counter register for the first thread that is coherent relative to a previous value in the counter register for the first thread and the merging of the N-bit value into the accumulator maintains a coherent value for the larger, N+M-bit accumulated value.

9. The apparatus of claim 8, wherein the counter register and the accumulator each have respective least-significant-bits segments and most-significant bits segments, and wherein the merging means includes means for overwriting the least-significant-bits segment of the accumulator by the least-significant-bits segment of the counter and adding the most-significant bits segment of the counter to the most-significant bits segment of the accumulator.

10. The apparatus of claim 8, wherein the restoring means includes means for resetting the most-significant-bits segment of the counter and overwriting the least-significant-bits segment of the counter by the least-significant-bits segment of the accumulator.

11. The apparatus of claim 8, comprising means for performing an update-and-read operation responsive to a call to read the accumulator, the means for performing the operation comprising:
   means for reading a value of the counter in the user state;
   means for reading a value of the accumulator in the system state;
   means for merging the counter value with the accumulator value and saving this as an early-read-time performance event count;
   means for reading a new value of the counter in the user state; and
   means for merging the new counter value with the accumulator value and saving this value as a late-read-time performance event count.

12. The apparatus of claim 8, comprising means for computing the number of monitored events for a certain process, the computing means comprising:
   means for performing a first update-and-read operation responsive to a call to read the accumulator at a beginning of the certain process, wherein such a means for performing the operation comprises:
      means for reading a value of the counter in the user state;
      means for reading a value of the accumulator in the system state;
      means for merging the counter value with the accumulator value and saving this as an early-read-time performance event count;
      means for reading a new value of the counter in the user state; and
      means for merging the new counter value with the accumulator value and saving this value as a late-read-time performance event count;
   means for performing a second update-and-read operation responsive to a call to read the accumulator at an ending of the certain process; and
   means for calculating a difference between the late-read-time performance event count saved for the first update-and-read operation and the early-read-time performance event count saved for the second update-and-read operation.

13. The apparatus of claim 12, wherein the counter register and the accumulator each have respective least-significant-bits segments and most-significant bits segments, and wherein the merging means includes means for overwriting the least-significant-bits segment of the accumulator by the least-significant-bits segment of the counter and adding the most-significant bits segment of the counter to the most-significant bits segment of the accumulator.

14. The apparatus of claim 13, wherein the restoring means includes means for resetting the most-significant-bits segment of the counter and overwriting the least-significant-bits segment of the counter by the least-significant-bits segment of the accumulator.

15. A computer program product for counting performance events for a computing system, wherein the system includes i) a processor having a set of on-chip performance monitoring counter registers and ii) system memory, the computer program product comprising:
   a) instructions for incrementing an N-bit value in one of the performance monitoring counter registers responsive to occurrences of a monitored event for a first processing thread so that the N-bit value provides a measured value for the event in association with the thread;
   b) instructions for merging the N-bit value of the counter register for the first processing thread into an N+M-bit value in an accumulator in system memory, wherein the merging is responsive to a switch from the first thread to a second thread; and
   c) instructions for restoring the N-bit value for the first thread to the counter register from the accumulator responsive to a switch back to the first thread, wherein despite any thread switches the restoring means maintains a value in the counter register for the first thread that is coherent relative to a previous value in the counter register for the first thread and the merging of the N-bit value into the accumulator maintains a coherent value for the larger, N+M-bit accumulated value.

16. The computer program product of claim 15, wherein the counter register and the accumulator each have respective least-significant-bits segments and most-significant bits segments, and wherein the instructions for merging include instructions for overwriting the least-significant-bits segment of the accumulator by the least-significant-bits segment of the counter and adding the most-significant bits segment of the counter to the most-significant bits segment of the accumulator.

17. The computer program product of claim 15, wherein the instructions for restoring include instructions for resetting the most-significant-bits segment of the counter and overwriting the least-significant-bits segment of the counter by the least-significant-bits segment of the accumulator.

18. The computer program product of claim 15, comprising instructions for performing an update-and-read operation responsive to a call to read the accumulator, the instructions for performing the operation comprising:

instructions for reading a value of the counter in the user state;

instructions for reading a value of the accumulator in the system state;

instructions for merging the counter value with the accumulator value and saving this as an early-read-time performance event count;

instructions for reading a new value of the counter in the user state; and instructions for merging the new counter value with the accumulator value and saving this value as a late-read-time performance event count.

19. The computer program product of claim 15, comprising instructions for computing the number of monitored events for a certain process, the instructions for computing comprising:

instructions for performing a first update-and-read operation responsive to a call to read the accumulator at a beginning of the certain process, wherein such instructions for performing the operation comprise:

instructions for reading a value of the counter in the user state;

instructions for reading a value of the accumulator in the system state;

instructions for merging the counter value with the accumulator value and saving this as an early-read-time performance event count;

instructions for reading a new value of the counter in the user state; and instructions for merging the new counter value with the accumulator value and saving this value as a late-read-time performance event count;

instructions for performing a second update-and-read operation responsive to a second call to read the accumulator at an ending of the certain process; and instructions for calculating a difference between the late-read-time performance event count saved for the first update-and-read operation and the early-read-time performance event count saved for the second update-and-read operation.

20. The computer program product of claim 19, wherein the counter register and the accumulator each have respective least-significant-bits segments and most-significant bits segments, and wherein the instructions for merging include instructions for overwriting the least-significant-bits segment of the accumulator by the least-significant-bits segment of the counter and adding the most-significant bits segment of the counter to the most-significant bits segment of the accumulator.

21. The computer program product of claim 20, wherein the instructions for restoring include instructions for resetting the most-significant-bits segment of the counter and overwriting the least-significant-bits segment of the counter by the least-significant-bits segment of the accumulator.

\* \* \* \* \*